United States Patent Office 3,163,927
Patented Jan. 5, 1965

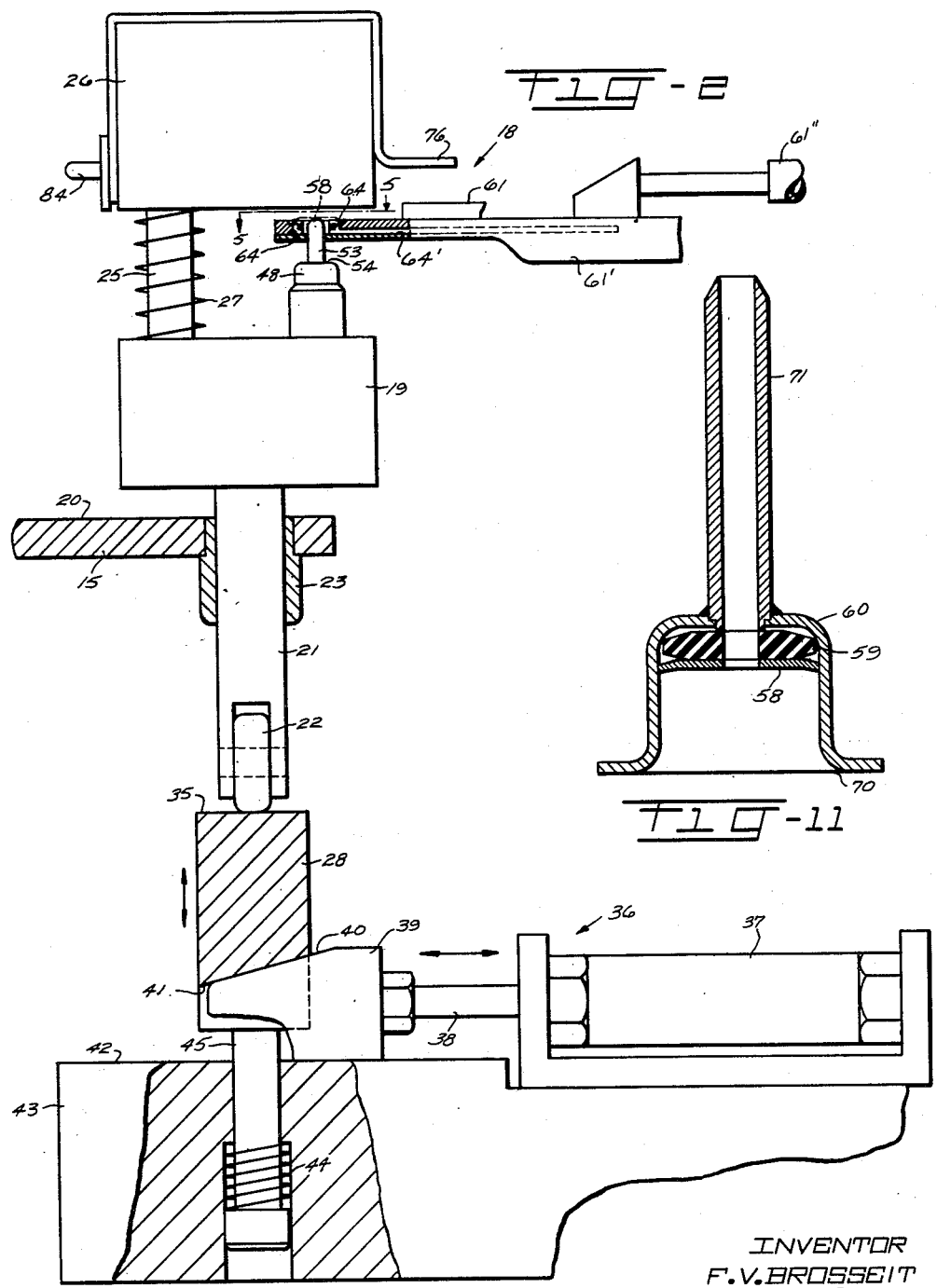

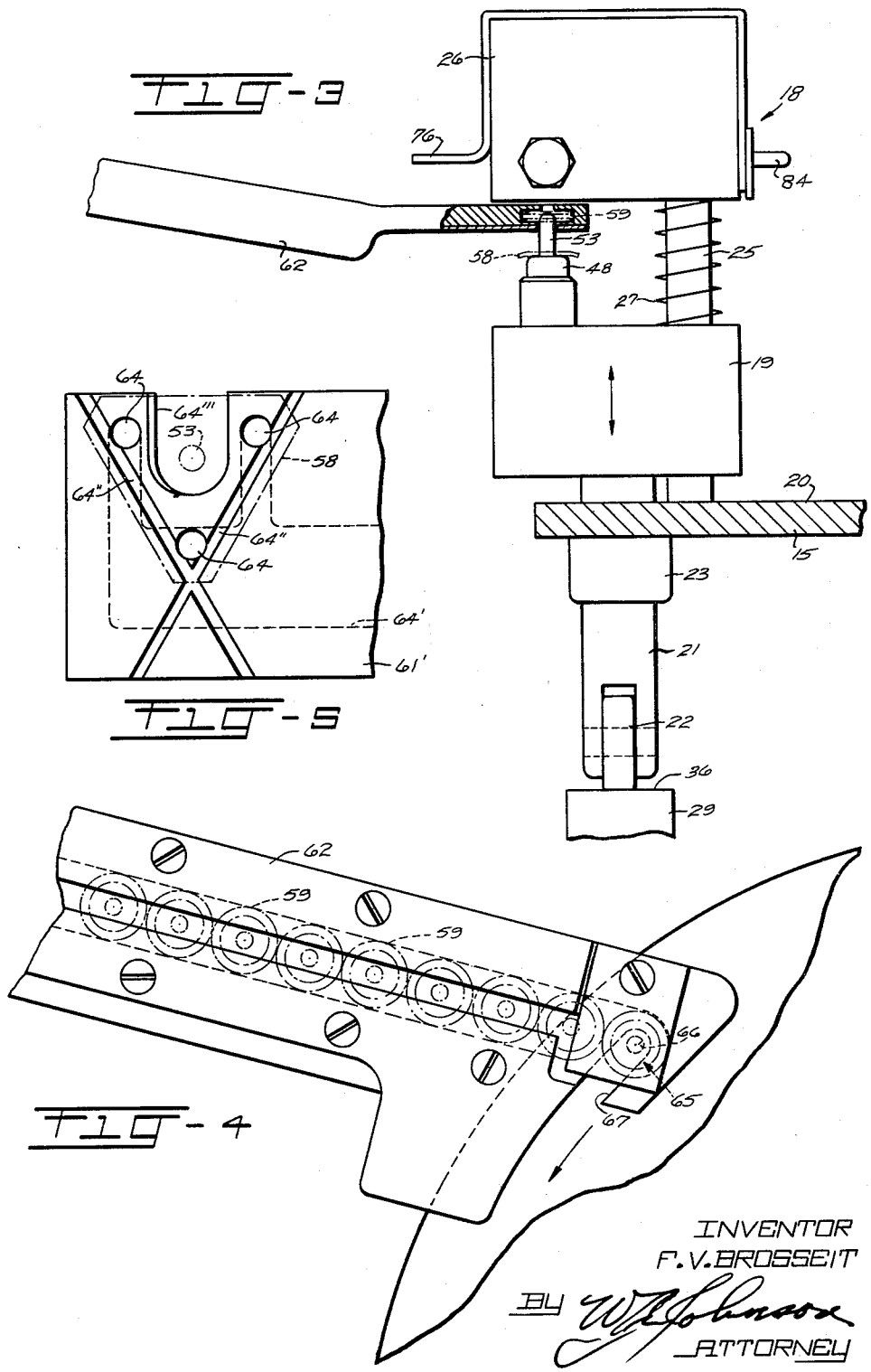

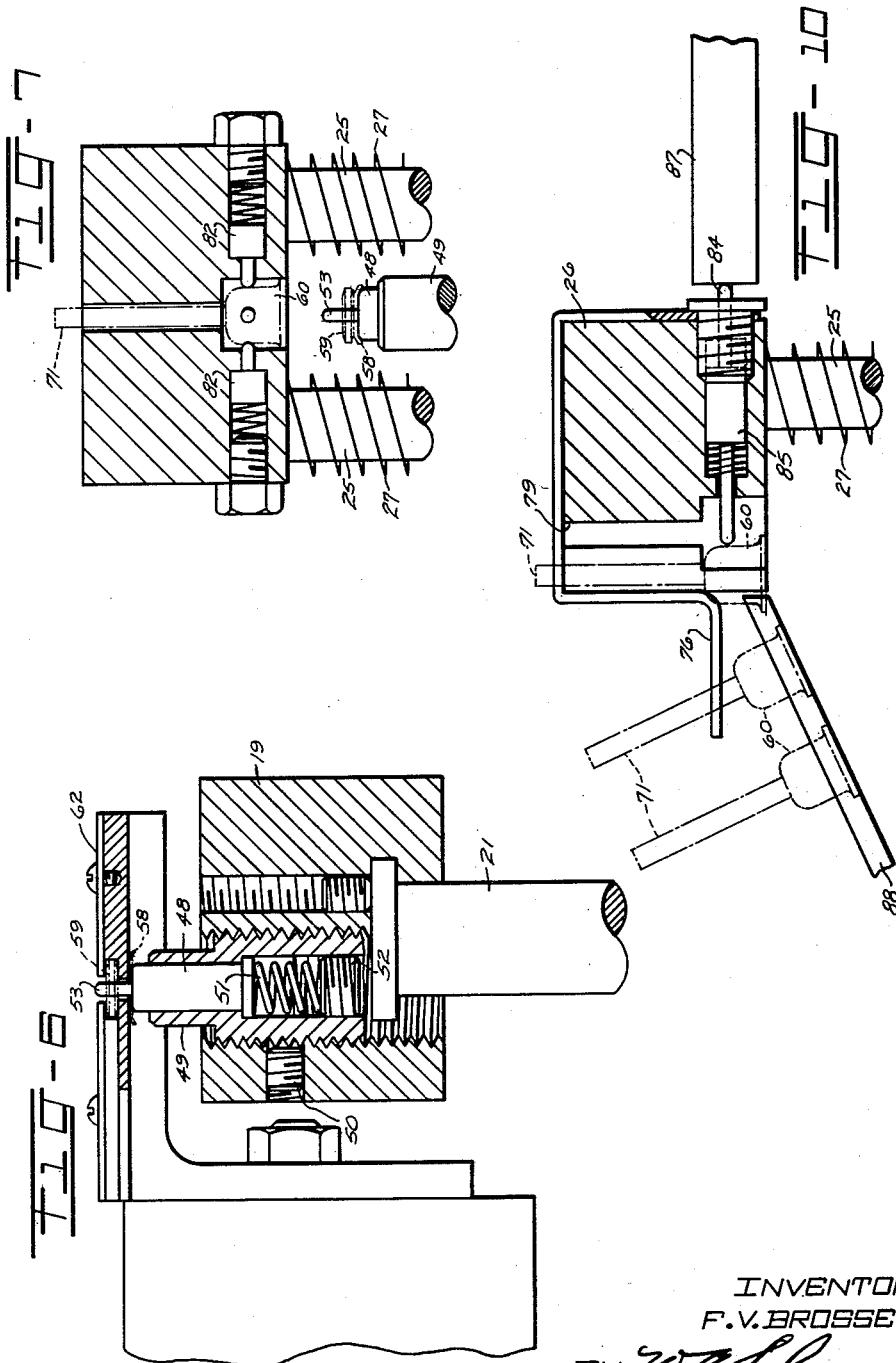

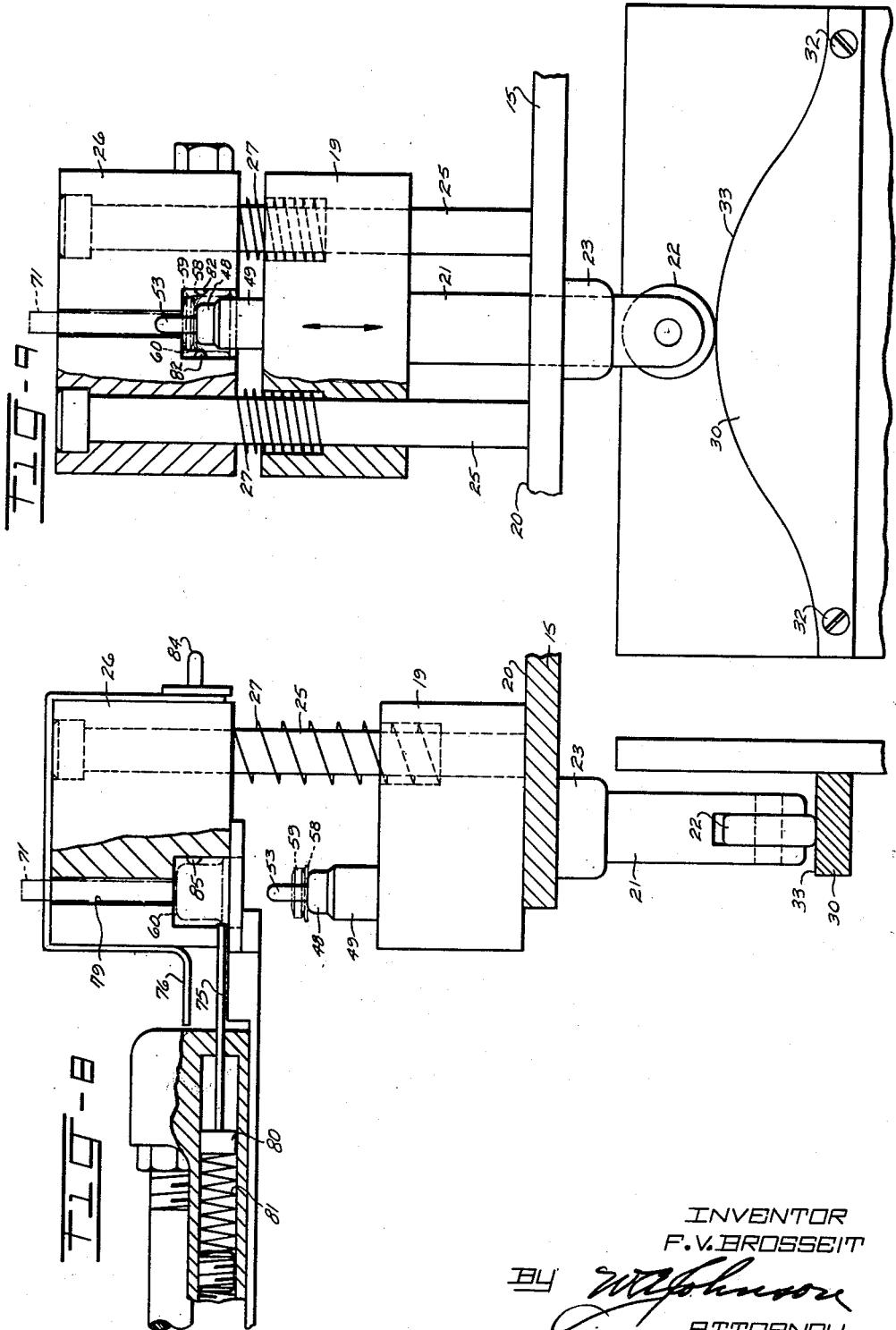

3,163,927
APPARATUS FOR LOADING PARTS IN CANS
Fritz V. Brosseit, Kansas City, Mo., assignor to Western Electric Company, Incorporated, New York, N.Y., a corporation of New York
Filed Mar. 20, 1963, Ser. No. 266,687
10 Claims. (Cl. 29—203)

This invention relates to apparatus for loading parts in cans, particularly getters in tubulated cans for transistors.

In the manufacture of certain types of transistors, tubulated cans are used to house the transistor parts supported by the headers. Prior to the attachment of the housings or cans to the headers getters are inserted in the cans and held in place by resilient members identified as springs. Heretofore, these parts have been assembled in the cans by hand and the present object of the invention is an apparatus operable automatically to efficiently receive the cans and the parts, to be loaded therein, which is efficient and accurate in loading the parts in the cans.

According to the object, the invention comprises a turret mounted for rotation between intervals of rest and having loading units mounted at equally spaced centers about the turret for successive registration with part feeding means at feeding stations to pick up the parts in their successive order from the feeding stations and subsequently mount them into cans moved singly into another feeding station.

Other objects and advantages will be apparent from the following detailed description when considered in conjunction with the accompanying drawings wherein:

FIG. 2 is a vertical sectional view of a portion of the turret showing a loading unit about to receive one of the parts; namely, a spring;

FIG. 3 is a vertical sectional view of a portion of the turret illustrating one of the units about to receive another part; namely, a getter;

FIG. 4 is a fragmentary top plan view of the part or getter feeding means;

FIG. 5 is a fragmentary top plan view of the part or spring feeding means taken along the line 5—5 of FIG. 2;

FIG. 6 is a fragmentary vertical sectional view of one of the units receiving the second part or getter;

FIG. 7 is a fragmentary sectional view of the units locating a can to receive the part;

FIG. 8 is a fragmentary vertical sectional view of one of the units receiving a can and locating it to receive the parts;

FIG. 9 is a fragmentary vertical sectional view of the structure shown in FIG. 7 illustrating the parts being loaded in the can;

FIG. 10 is a fragmentary sectional view of one of the units showing the ejection of the loaded can therefrom; and FIG. 11 is an enlarged vertical sectional view of one of the loaded cans.

Figure 1:
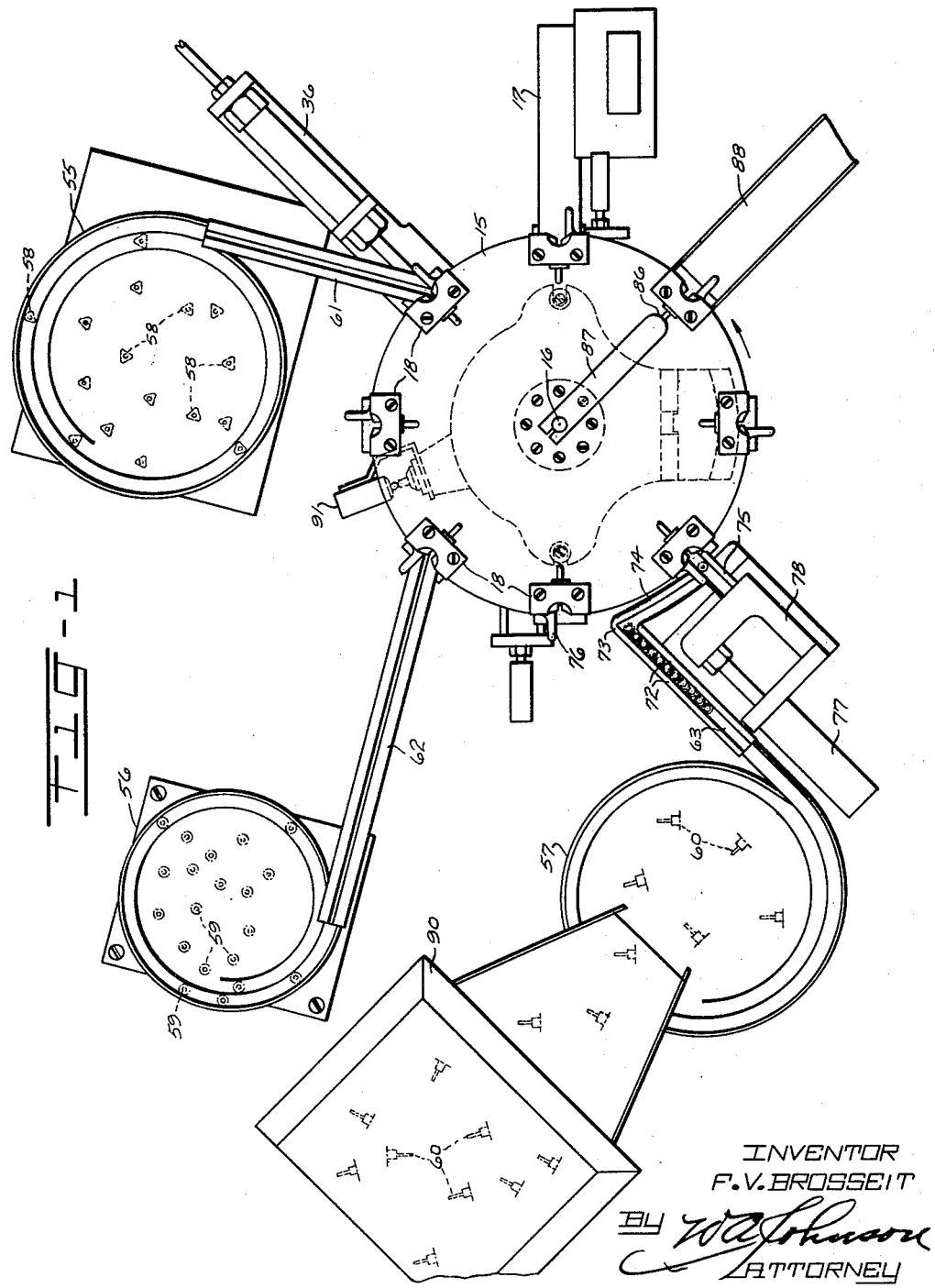
FIG. 1 is a top plan view of the apparatus.

In FIG. 1, the apparatus is shown as having a turret 15, rotatable about a fixed shaft 16 by a driving unit 17 which may be of any commercially known type adapted to advance the turret a known distance about the fixed axis or shafts 16 between predetermined time intervals of rest. The turret has eight loading units 18 radially positioned and equally spaced about its periphery. The units 18 are identical in structure, each having a movable member 19 normally resting upon an upper surface 20 of the turret 15 and mounted on the upper end of a rod 21, which is bifurcated at its lower end to rotatably support a cam follower 22. The rod 21 moves through a bushing 23, mounted in an aperture of the turret. A pair of guide rods 25 have their lower ends fixed to the turret 15 and extend upwardly through the member 19 as illustrated in FIG. 8. Head members 26 are fixedly mounted on the upper ends of the guide rods and springs 27, disposed concentric with the rods and positioned beneath the head member 26, normally urge the member 19 downwardly causing it normally to lie on the surface 20 of the turret 15 yet permit it to move upwardly when the cam follower 22 is moved into engagement with any one of three cams; cam 28 of FIG. 2, cam 29 of FIG. 3 and cam 30 of FIGS. 7 and 8. The cam 30 is mounted at a fixed position by suitable means 32 and provided with a cam surface 33. The cams 28 and 29 are similar in contour to the cam 30 and provided with cam surfaces 34 and 35 yet these cams are movable to bring about the desired actions of the members 19.

The cams 28 and 29 are identical and are provided with like moving means 36, only one being shown. The moving means 36, shown in detail in FIG. 2, includes an air cylinder 37 having a piston rod 38 fixed to an auxiliary cam 39 having a cam surface 40 positioned to engage a tapered surface 41 of the cam 28. When the air cylinder is operated as shown in FIG. 2, it will raise the cam 28 a predetermined distance from its normal position, where it rests upon a surface 42 of a support 43 urged by springs 44 disposed concentric with guide rods 45, only one of which is shown in this figure.

Each loading unit 18 is provided with a loading pin 48 disposed in a guide 49 threadedly mounted in the member 19 as shown in FIG. 5, the guide being adjusted therein through its threaded connection with the member 19 and secured at any desired position by a set screw 50. A spring 51 normally urges the loading pin 48 upwardly under a variable force controlled by an adjustable screw 52. Each loading pin 48 has a reduced portion 53 of a size adapted to enter apertures of parts to be loaded, the upper end of this reduced portion being rounded or semispherical. A shoulder 54 is also provided at the junction of the main loading pin portion 48 and reduced portion 53 to support the parts as they are received and to serve in forcing the parts into the can.

In FIG. 1 feeding units 55, 56 and 57 commercially known as vibrating feeders, respectively are designed to feed parts such as springs 58, getters 59 and tubulated cans 60 in predetermined order along the chutes 61, 62 and 63. The chutes from these feeding units are directed toward the turret 15 at spaced positions or stations to feed their respective parts and can successively to the loading units 18. In FIG. 2 a feeder 61' receives a spring 58 from the end of the chute 61 and transfers it to a loading pin 48 of the loading unit 18 at that station. The feeder 61' is reciprocated by an air cylinder 61" in timed relation with the turret 15 and the respective loading units 18 to pick the leading part or spring 58 from the end of the chute 61 and position it to be picked up by the next unit 18. The feeder 61', as shown in plan view in FIG. 5, has three suction ports 64 open to the top surface of the feeder, on which the part 58 will be held by suction, in communication with a suction line 64', the suction in which is controlled by conventional means not shown, and also grooves 64" to spread the suction effect over larger areas of the spring part 58. A notch 64''' in the feeder permits access to the spring 58 by the reduced portion 53 of the loading pin 48. The parts or springs 58 are normally flat, formed of resilient material and centrally apertured to receive the reduced portion 53 of the loading pin of each unit 18. The chute 61, is provided with conventional means to retain the remaining springs therein and allow them to advance after each spring is removed to locate the next leading spring 58 at the pick-off position. Therefore, as each loading unit 18 comes to rest at the spring feeding station its loading pin 48 receives the part 58 and carries it to the next two stations, that is, to the station where the parts or getters 59 are fed through the chute 62, and to the next station where the parts 58 and 59 are to be loaded in a can 60. The contour of the chute 62 is shown in more detail in FIGS. 4 and 6, where the parts or getters 59 are fed successively to a pickup portion indicated generally at 65. Each loading unit 18 when moved to this station has the reduced portion 53 of the loading pin aligned with an aperture 66 in the part or getter at the position 65 so that when the member 19 of the loading unit 18 is moved upwardly, the part or getter 59 will be engaged by the reduced portion 53 of the loading pin 48 and moved laterally through a notch 67 out of the chute 62. At this time, as each loading unit 18 reaches the getter feeding station it has the two parts 58 and 59 supported thereby which will be loaded into a can 60 adjacent the next station.

The cans, with their flanged open ends 70, rest on the bottom of the chute 63, their tubulations 71 extending upwardly. The chute 63 is similar in formation to the chute 62 having side parts 72 extending over the flanged portions of the cans 60 to hold them against falling. Actually, the chute 63 is somewhat L-shaped with one leg of the chute extending from the feeder 57 to a stop or pickup portion 73 and another leg 74 extending from this portion to a position adjacent a feeding element 75. Each unit 18 has a feed finger 76 extending outwardly a distance sufficient to engage the can 60 at the pickup portion 73, which will be the leading can in the chute and move this can to a position in front of the feeding element 75. The feeding element now shown in FIG. 1 in its advanced position normally is located outwardly beyond the position into which the can is moved by the feed finger 76 so that when the turret comes to rest at this station, an air cylinder 77 is operated to move a slide 78, which supports the feeding element 75 into the position shown to move the can into a nest 79 in the upper member 26 of the loading unit 18. In FIG. 7, it will be noted, that the feeding element 75 is supported by a plunger 80 backed by a cushioning spring 81 to assure accurate location of each can 60 in the nest 79. Other spring-pressed plungers 82, FIG. 6, cooperating with the finger 75, are positioned to engage spaced portions of the outer surface of the can 60 not only to locate the can accurately in the nest 79, but hold the can against displacement during mounting of the parts 58 and 59 therein.

In FIG. 7, the parts 58 and 59 are shown supported by the loading pin 48 at that station ready to be loaded in the can. The loading actually takes place after the feeding element 75 has been returned to its normal position and the turret starts its next intermittent movement causing the cam follower 22 of this respective unit 18 to ride on the surface 33 of the cam 30 to force the member 19 upwardly as shown in FIG. 8 to force the loading pin 48 upwardly and thereby load the parts 58 and 59 in the can 60. When the cam follower 22 leaves the high portion of the cam 30 the loading pin 48 moves downwardly leaving the parts 58 and 59 in the can.

The loaded can continues to remain in the nest 49 until it reaches the ejecting station where a pin 84 of a plunger 85 moves into engagement with the rounded end 86 of a stationary cam 87 FIG. 1 to thereby force the loaded can 60 out of the nest 79 and cause it to slide down a chute 88 to a receptacle (not shown).

Operation

After each of the feeding units 55, 56 and 57 have been supplied with a desired number of their respective parts, the unit 57 having additional supply means 90 for the cans 60, the apparatus may be set in operation to cause intermittent movements of the turret 15 between predetermined timed intervals of rest to advance the loading units 18 successively to the various stations. Suitable means, such as a switch 91, may be operated as the turret comes to rest to cause operation of the air cylinders or power means 36 and 77. Through the feeding means 55 and its respective chute 61, there is always a part 58 ready at the pickup portion to be received by the feeder 61' from the chute 61 and positioned for the loading pin 48 at that station. The loading unit is operated through operation of its air cylinder 36 to force the loading pin upwardly to enter the aperture of the part 58 and remove it from the feeder 61' during its next motion of the table. Action takes place at the next station where a part 59 is ready at the pickup portion 65 of the chute 62 in alignment with the loading pin 48 of the mounting unit 18 at that station. When the second part or getter is picked up by the loading pin 48 from the chute 62 the part is caused to rest on the spring or part 58. Therefore, as each loading unit approaches the next station, the loading pin 48 is provided with the parts 58 and 59; namely, the spring and the getter to be loaded into a can.

The movement of each unit toward the final loading station causes the feed finger 76 of that unit to engage the can at the pick-off portion 73 of the chute 63 and move it in front of the feeding element 75 so that during the interval of rest of the loading unit at this final loading station, the air cylinder 77 is operated to move the can into the nest 79 of the upper member 26 ready to receive the parts 58 and 59. The can remains in the nest and during the next movement of the turret, the loading pin 48 is operated by the cam follower riding on the cam surface 33 from a low portion of the cam shown in FIG. 7 over the high portion of the cam shown in FIG. 8 and then again to the lower portion of this cam. As the cam follower rides upwardly on the cam surface 33, the loading pin 48 is forced upwardly to force the parts 58 and 59 into the can. While this is being accomplished the six corners of the three ends of the part 58, defined as a spring due to its resilient nature, are forced downwardly as they drag on the inner surface of the can and serve as positioning and holding means for the part or getter 59, which is forced into close engagement with the inner surface of the can adjacent to and surrounding the tubulation 71.

At the end of the next intermittent movement of the turret the loaded can will be ejected from its nest 79 by the cam 87 engaging the pin 84 FIG. 9 of the plunger 85. After leaving the ejecting station each loading unit is empty and ready to start its next cycle to pick up the first part 58, the second part 59 and to eventually load these parts into a can selected by this particular loading unit at the final loading station and eventually again reach the ejecting station.

It is to be understood that the above-described arrangements are simply illustrative of the application of the principles of the invention. Numerous other arrangements may be devised by those skilled in the art which will embody the principles of the invention and fall within the spirit and scope thereof.

What is claimed is:

1. An apparatus for loading parts in cans having open ends comprising:

a turret mounted for rotation about an axis, loading units mounted on the turret at equally spaced centers about the turret, means operable to move the turret intermittently to successively locate the loading units at various stations located at fixed positions about the turret, a part feeding unit mounted at one of the stations and operable to feed the parts successively to the loading units when the loading units are located at said station, a can feeding unit mounted at another of the stations and operable to feed the cans successively to the loading units when the loading units are located at said station, a nest disposed in each loading unit to receive and support a can from the can feeding unit, a loading pin movably disposed in each loading unit and actuable at the part feeding station to remove a part therefrom, and means to actuate the loading pins successively to locate the parts sucessively in the cans through the open ends thereof.

2. An apparatus for loading parts in cans according to claim 1 in which:

each loading unit has a stationary member fixedly mounted on the turret and in which the nest is disposed in alignment with the loading pin.

3. An apparatus for loading parts in cans according to claim 1 in which:

each loading unit has a stationary member fixedly mounted on the turret and in which the nest is disposed, in alignment with the loading pin, a member normally supported by the turret to support the loading pin, and movable with and relative thereto, and means to move the movable member relative to the turret at different intervals to cause the loading pin to pick a part at the part feeding station and subsequently load it in the can in the nest.

4. An apparatus for loading parts in cans according to claim 1 in which:

each loading unit has a stationary member fixedly mounted on the turret and in which the nest is disposed in alignment with the loading pin, a member normally supported by the turret to support the loading pin, and movable with and relative thereto, means to move the movable member relative to the turret at different intervals to cause the loading pin to pick a part at the part feeding station and subsequently load it in the can in the nest, a chute disposed at a last station for receiving the loaded cans, and means mounted adjacent said last station and operable to successively eject the loaded cans from the loading units at the chute.

5. An apparatus for loading apertured parts in cans having open ends comprising:

a turret mounted for rotation about an axis, spaced feeding stations for parts and cans disposed at spaced positions about and adjacent the turret, loading units mounted on the turret and disposed at equally spaced centers about the axis on the turret, a fixed member for each loading unit mounted on the turret and having a nest therein for receiving a can, a loading pin disposed in each loading unit, normally spaced from the nest thereof and movable in alignment with the nest in a path to enter apertures of parts at certain of the spaced feeding stations, chutes fixedly mounted at certain of the feeding stations and having ends adapted to locate parts successively with their apertures at given positions above the path, a chute fixedly mounted at another of the feeding stations and adapted to feed cans successively to a pick-off portion thereof spaced from a feeding portion thereof, and a finger carried by each loading unit adapted to engage each can at the pick-off portion of the can chute and move it to the feeding portion thereof.

6. An apparatus for loading apertured parts in cans according to claim 5 in which:

an operable feeder is mounted adjacent the feeding portion of the can chute, and means to operate the feeder to move each can at the feeding portion into the nest of the adjacent loading unit.

7. An apparatus for loading apertured parts in cans according to claim 5 in which:

an operable feeder is mounted adjacent the feeding portion of the can chute, means to operate the feeder to move each can at the feeding portion into the nest of the adjacent loading unit, and separate means mounted adjacent the part feeding stations to move the loading pins upwardly successively to cause them to enter the parts at the locating ends of the chutes at said stations and remove them from the chutes.

8. An apparatus for loading apertured parts in cans according to claim 5 in which:

an operable feeder is mounted adjacent the feeding portion of the can chute, means to operate the feeder to move each can at the feeding portion into the nest of the adjacent loading unit, separate means mounted adjacent the part feeding stations to move the loading pins upwardly successively to cause them to enter the parts at the locating ends of the chutes at said stations and remove them from the chutes, the parts being carried in stacked formation on the loading pins, and means positioned to engage the loading pins and force them successively into the nests of their loading units to load the parts in the cans disposed in the nests.

9. An apparatus for loading apertured parts in cans according to claim 5 in which:

an operable feeder is mounted adjacent the feeding portion of the can chute, means to operate the feeder to move each can at the feeding portion into the nest of the adjacent loading unit, separate means mounted adjacent the part feeding stations to move the loading pins upwardly successively to cause them to enter the parts at the locating ends of the chutes at said stations and remove them from the chutes, the parts being carried in stacked formation on the loading pins, means positioned to engage the loading pins and force them successively into the nests of their loading units to load the parts in the cans disposed in the nests, the first part disposed on each loading pin being a resilient retaining part, and a shoulder for each loading pin adapted to cause forcing of the retaining parts into frictional engagement with an inner surface of the cans.

10. An apparatus for loading apertured parts in cans according to claim 5 in which:

means extends into each nest to center each can therein, a plunger movably supported by each unit normally positioned to engage each can in the nest thereof, and means mounted at a fixed position relative to the units to actuate the plungers successively to eject each loaded can from its nest.

References Cited in the file of this patent

UNITED STATES PATENTS

| | | |
|---|---|---|
| 2,692,424 | Habel | Oct. 26, 1954 |
| 3,046,641 | Takahashi et al. | July 31, 1962 |
| 3,067,496 | Rayburn | Dec. 11, 1962 |